(12) United States Patent
Malgorn et al.

(10) Patent No.: US 10,543,436 B2
(45) Date of Patent: Jan. 28, 2020

(54) FILTER ASSEMBLY INCLUDING AN ATTACHMENT MEMBER FOR A REMOVABLE FILTER CARTRIDGE

(71) Applicant: CUMMINS FILTRATION IP, INC., Columbus, IN (US)

(72) Inventors: Gérard Malgorn, Quimper (FR); Arnaud Le Ven, Ergue Gaberic (FR)

(73) Assignee: Cummins Filtration IP, Inc., Columbus, IN (US)

( * ) Notice: Subject to any disclaimer, the term of this patent is extended or adjusted under 35 U.S.C. 154(b) by 51 days.

(21) Appl. No.: 15/621,110

(22) Filed: Jun. 13, 2017

(65) Prior Publication Data
US 2017/0274301 A1 Sep. 28, 2017

Related U.S. Application Data

(62) Division of application No. 13/616,243, filed on Sep. 14, 2012, now Pat. No. 9,724,627.

(30) Foreign Application Priority Data

Jul. 19, 2012 (FR) ...................... 12 56974

(51) Int. Cl.
*B01D 29/21* (2006.01)
*B01D 27/00* (2006.01)
*B01D 35/00* (2006.01)
*B01D 29/90* (2006.01)
(Continued)

(52) U.S. Cl.
CPC ........... *B01D 29/21* (2013.01); *B01D 29/908* (2013.01); *B01D 2201/0415* (2013.01); *B01D 2201/24* (2013.01); *B01D 2201/295* (2013.01); *B01D 2201/305* (2013.01); *B01D 2201/306* (2013.01); *B01D 2201/316* (2013.01); *B01D 2201/34* (2013.01); *B01D 2201/4015* (2013.01); *B01D 2201/4084* (2013.01); *Y10T 29/4973* (2015.01)

(58) Field of Classification Search
USPC ....... 210/130, 232, 234, 235, 418, 445, 450, 210/454, 457, 485, 487, 493.2
See application file for complete search history.

(56) References Cited

U.S. PATENT DOCUMENTS

| 2,303,625 A | 12/1942 | Denbigh |
| 4,237,015 A | 12/1980 | Fearnhead |
| 4,473,471 A | 9/1984 | Robichaud et al. |

(Continued)

FOREIGN PATENT DOCUMENTS

| CN | 101616723 | 12/2009 |
| WO | WO 95/00232 | 1/1995 |

OTHER PUBLICATIONS

First Office Action and Translation for Chinese Patent Application No. 201310072399.X dated Feb. 15, 2015, 12 pages.

(Continued)

*Primary Examiner* — Hayden Brewster
(74) *Attorney, Agent, or Firm* — Foley & Lardner LLP

(57) ABSTRACT

A filter assembly includes a canister housing closable by a lid and containing a removable and replaceable filter element cartridge. The lid is part of the filter element cartridge and a single unitary component therewith, such that removal of the filter element cartridge also removes the lid, and replacement of the filter element cartridge also replaces the lid.

12 Claims, 11 Drawing Sheets

(51) Int. Cl.
B23P 6/00 (2006.01)
B25B 27/00 (2006.01)

(56) References Cited

U.S. PATENT DOCUMENTS

| | | |
|---|---|---|
| 5,772,881 A | 6/1998 | Stockhowe et al. |
| 5,858,227 A | 1/1999 | Stone |
| 5,919,279 A | 7/1999 | Merrit |
| 6,063,276 A | 5/2000 | Sherman et al. |
| 7,614,390 B2 | 11/2009 | Holzmann et al. |
| 2003/0183568 A1 | 10/2003 | Hoffman et al. |
| 2003/0226793 A1 | 12/2003 | Merritt et al. |
| 2007/0034631 A1 | 2/2007 | Minowa et al. |
| 2007/0267338 A1 | 11/2007 | Menez et al. |
| 2009/0050121 A1* | 2/2009 | Holzmann ............. B01D 45/04 123/573 |
| 2009/0057219 A1 | 3/2009 | Bagci et al. |
| 2010/0147754 A1 | 6/2010 | Le Ven et al. |
| 2010/0243554 A1 | 9/2010 | Herrin et al. |
| 2011/0272340 A1 | 11/2011 | Sasur et al. |
| 2012/0060453 A1 | 3/2012 | Holzmann et al. |
| 2013/0240430 A1 | 9/2013 | Sherman et al. |
| 2013/0248464 A1 | 9/2013 | Schweitzer |

OTHER PUBLICATIONS

Second Office Action and Translation for Chinese Patent Application No. 201310072399.X dated Jul. 27, 2015, 12 pages.

\* cited by examiner

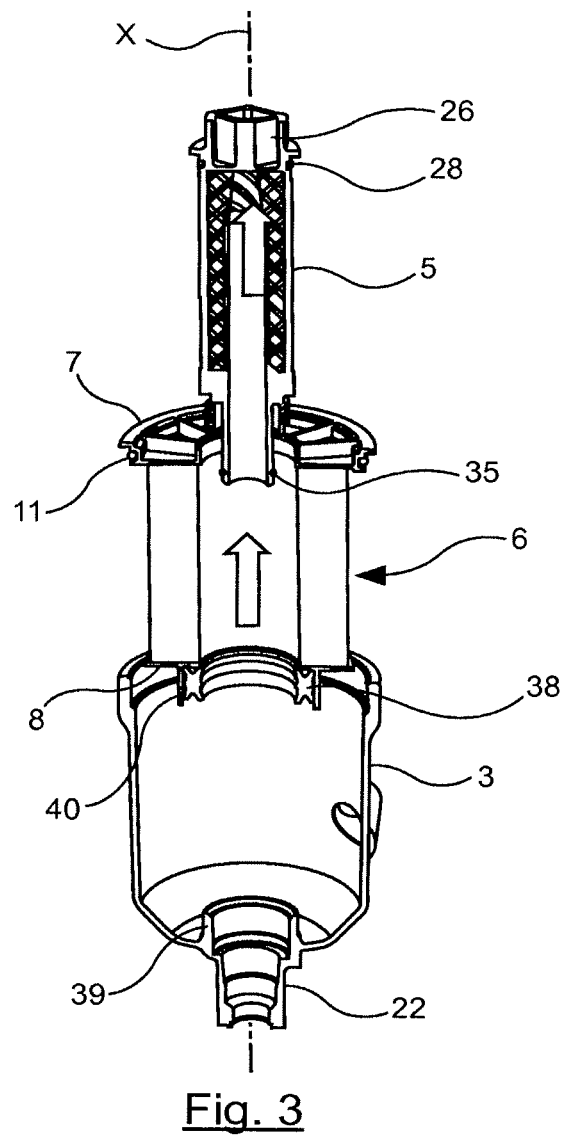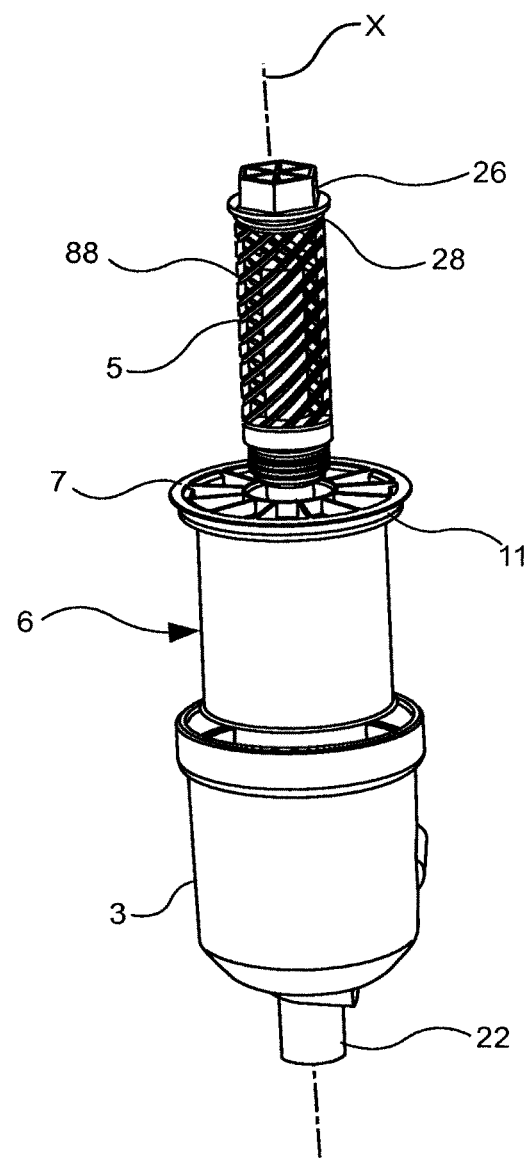
Fig. 3
Fig. 4

FILTER ASSEMBLY INCLUDING AN ATTACHMENT MEMBER FOR A REMOVABLE FILTER CARTRIDGE

CROSS-REFERENCE TO RELATED APPLICATIONS

This application is a divisional of U.S. patent application Ser. No. 13/616,243, filed Sep. 14, 2012, which claims the benefit of and priority from, and includes the disclosure of, French Patent Application No. 12/56974, filed Jul. 19, 2012. The contents of both applications are hereby incorporated by reference in their entirety.

PARENT FRENCH APPLICATION

The following is an English translation in accordance with the above noted parent French application and the present disclosure.

BACKGROUND AND SUMMARY

The disclosure relates to the field of designing and making of filter assemblies used to filter fluids, including fluids flowing in hydraulic motors or apparatuses, and other fluid flow applications.

Such filter assemblies consist of a filter element or filter body, comprising a vessel and a cover, within which there is disposed a filter cartridge including a filtering medium, generally cylindrical in shape and surrounding a tubular cavity, the filtering medium being possibly made for example of paper, cardboard or again felt or another porous material, such as a synthetic or non-synthetic, woven or non-woven material. The filter cartridge also comprises two end flanges delimiting the filtering medium.

Such filter cartridges generally cooperate with a tube, in particular a center tube, which may or may not be fixedly joined to the flanges. The external diameter of the tube is close to the internal diameter of the tubular cavity surrounded by the filtering medium, so as to limit the deformations of the medium caused by the pressure exerted within the filter assembly.

The end flanges are formed by a first flange, which may consist of an upper flange, and a second flange, which may consist of a lower flange. The role of the flanges is to participate in the tight sealing of the filter cartridge and to enable the fixed joining of the filter cartridge to the permanent part of the filter assembly.

The filter cartridge is, in this type of filter assembly, generally removable or detachable so it can be replaced at the end of its service life by a new filter cartridge.

The operator uncaps the cover of the filter assembly and then grasps the filter cartridge, removes it from the vessel and replaces it with a new filter cartridge. In addition, the operator changes the gasket between the cover and the vessel. These operations cause the operator to handle several elements which are liable to get soiled on parts that would then come into contact with the clean, filtered fluid, after the filtering medium, so that the contamination is no longer stopped by the filter but goes directly to the motor for example. Besides, these numerous operations give rise to substantial labor time for the maintenance of the filter assembly.

The disclosure provides a filter assembly that is clean, fast and easy to maintain during the replacement of the filter cartridge.

The disclosure provides a filter assembly that has a limited number of parts.

The disclosure provides a filter assembly for which it is known with certainty that, when it is closed, it includes a filter cartridge.

The disclosure provides a filter assembly including:
a filter element including a vessel and a cover,
a tube, in particular a central tube, within the filter element extending along a longitudinal axis,
a removable filter cartridge housed in the filter element and comprising a first flange, a second flange, and a filtering medium extending between the first and second flanges and having a tubular hollow space to surround the tube.

In one embodiment, the first flange of the filter cartridge at least partially forms the cover of the filter element.

The first flange at least partially closes the filter assembly. The filter cartridge therefore includes a part, namely at least one part of the first flange, partially forming an external wall of the filter assembly.

The replacement of a filter cartridge is relatively easy. Indeed, removing the cover results in removing the filter cartridge to which it is fixedly joined.

This also improves the cleanliness of the maintenance of the filter assembly.

In another embodiment, it is not possible to overlook the operation for positioning the filter cartridge, since the first flange at least partially forms the cover of the filter assembly.

The filter gasket requires no handling since it is fixedly joined to the first flange, and therefore to the filter cartridge that is removed, and to the new filter cartridge that is positioned.

According to one embodiment, the first flange is configured to cooperate by force with the vessel so as to close the filter element in a tightly sealed manner.

As a variant, or additionally, the first flange can rest on an upper edge of the vessel.

The free end portion of the vessel can take a substantially cylindrical form and the first flange a substantially circular external outline, configured to cooperate with the vessel in order to ensure tightly-sealed closure of the filter assembly.

The filter assembly may include a holder for holding the first flange on the vessel, especially configured to prevent the detachment of the first flange from the vessel and/or configured to enable the filter cartridge to be held fixedly in the vessel.

The holder can be distinct from the first flange and possibly from the filter cartridge. As a variant, the holder can be fixedly attached or fixed to the filter cartridge.

The holder enables the cover to be held firmly on the vessel, to ensure the safety of the closure of the filter assembly.

The tube can be fixed removably relative to the filter element, especially by screwing or by being clipped on or the like. The tube can be fixed by screwing a lower threaded part of the tube on to a corresponding threaded part of the vessel.

In this case, the first flange can for example include an aperture, in particular a central aperture, and the tube can include an upper extension passing through the aperture of the first flange and cooperating in a tightly sealed manner with the aperture, for example by a gasket. The upper extension is then configured to abut against an external face of the first flange and form the holder.

In this case, the filter cartridge can be replaced as follows. The removable tube is withdrawn. Thus, the filter cartridge is released and can then be withdrawn to be replaced by a new one and then the filter assembly is closed in putting the tube back into place.

The filter assembly can include a closing ring fixedly joined externally with an end portion of the vessel while at the same time being at least partially mobile, especially in rotation, relatively to the vessel and forming the holder.

In this case, the closing ring is configured so that, by partial rotation relatively to the vessel while remaining fixed to it, it can pass from a first position enabling the filter cartridge to be withdrawn from the vessel or enabling the filter cartridge to be positioned in the vessel to a second position preventing the filter cartridge from being withdrawn from the vessel or preventing the filter cartridge from being positioned in the vessel, and vice versa.

In the latter case, a peripheral shoulder of the first flange can for example have a plurality of fins, e.g. four fins. For its part the closing ring may, in a retaining shoulder extending diametrically inwards, include a plurality of notches configured to cooperate with the fins of the closing ring so as to make the closing ring pass, by partial rotation of the closing ring, from the first position in which the notches and the fins are superimposed to the second position in which the notches and the fins are positioned so as to be offset without superimposition. The retaining shoulder can be in contact with the first flange in the tightly-sealed closed position of the filter assembly.

The closing ring can be removable and can be configured in such a way that, when it is fixedly joined to the vessel in a holding position, it prevents any withdrawal of the filter cartridge.

The holding position can be one that prevents any movement of the filter cartridge in relation to the rest of the filter assembly. For example, if the closing ring is fixedly joined to the vessel by screwing, the holding position is a screwing position with a high tightening torque, for example torque greater than 25 Nm, so as to provide for the secured closing of the filter assembly.

The closing ring can be fixed by screwing to the vessel, the vessel including an external thread and the closing ring including a corresponding internal thread.

The first flange can be provided, in proximity to its periphery, with at least one elastic clip-on tab. The elastic clip-on tab or tabs can help in the mounting and/or dismounting of the filter cartridge.

The first flange can be equipped, on an external face, with a removable or non-removable grip, configured to enable or facilitate the grasping of the filter cartridge.

The filter assembly can comprise at least one ring gasket cooperating with the first flange to provide for the tight sealing of the closure between the vessel and the first flange.

In this case, the gasket is fixedly joined to the first flange and therefore to the filter cartridge, thus enabling it to be changed by the replacement of the filter cartridge.

In this case, the first flange may for example present a peripheral shoulder having a ring-shaped peripheral housing to house the gasket.

As a variant, the first flange may have a peripheral shoulder having a peripheral rib and the gasket may be configured to cooperate with the peripheral rib, for example by being fitted on to the peripheral rib.

The gasket can be configured, when there is a closing ring, to provide for tight sealing between the closing ring, the vessel and the first flange.

BRIEF DESCRIPTION OF THE DRAWINGS

Other features and aspects of the disclosure shall appear more clearly from the following description of embodiments, given by way of illustratory and non-exhaustive examples and from the appended drawings, of which:

FIG. 3 is a schematic illustration in longitudinal section of the dismantling of the filter assembly of FIG. 1.

FIG. 4 is a view similar to that of FIG. 3, in perspective.

DETAILED DESCRIPTION

Figure 1:
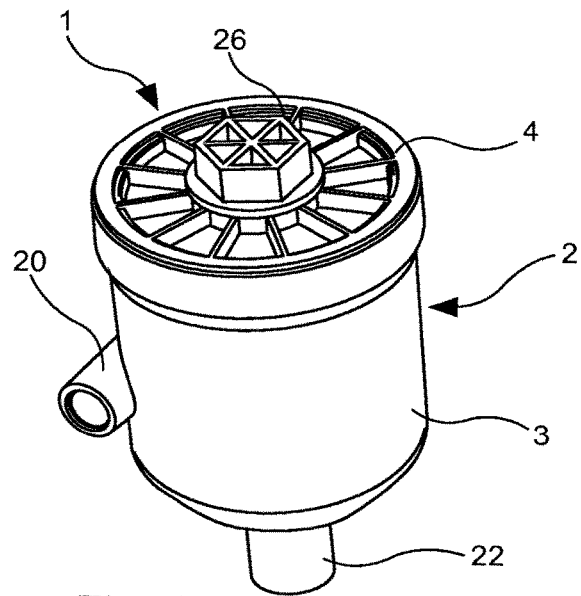
FIG. 1 is a schematic view in perspective of a filter assembly according to a first embodiment of the disclosure.

FIG. 1 shows a filter assembly 1 for fluids, for example oil, diesel or the like, flowing in a hydraulic motor or apparatus, or other fluids. This filter assembly 1, according to a first embodiment of the disclosure, has a filter element or body 2 comprising a vessel 3 and a cover 4.

Figure 2:
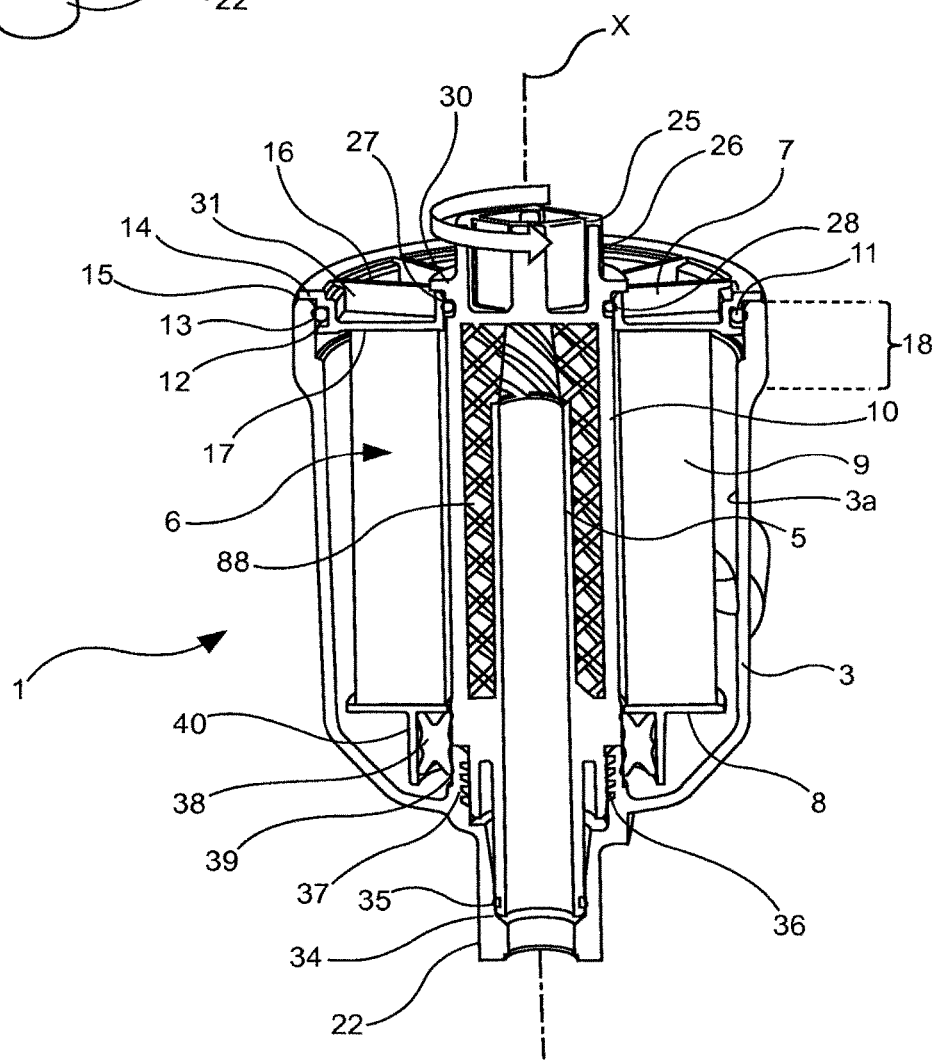
FIG. 2 is a schematic view in longitudinal section of the filter assembly of FIG. 1.

The filter assembly 1 includes a tube 5 which can be seen especially in FIG. 2, which is a central tube in this example. The tube 5 is inside the filter element 2 and extends along a longitudinal axis X.

The filter assembly 1 also includes a filter cartridge 6 housed in the filter element 2. The filter cartridge 6 comprises a first flange 7 or upper flange, a second flange 8 or lower flange, and a filtering medium 9 extending between the first and second flanges 7 and 8 and having a tubular hollow space 10 to surround the tube 5.

The filtering medium 9 can be chosen from the group constituted by: cellulose, especially paper or cardboard, felt, a woven or non-woven porous material, which may or may not be synthetic, or any other suitable filtering medium.

The filter assembly 1 furthermore includes, in this example, a lead-in channel 20 for leading in fluid to be filtered and an outlet channel 22 for the filtered fluid.

In the example shown, as can be seen, the tube 5 has an external relief 88 consisting of a plurality of fins tilted to retain the filtering medium 9 while enabling the passage of the fluid.

According to the disclosure, the first flange 7 of the filter cartridge 6 at least partially forms the cover 4 of the filter element 2.

The filter assembly is clean and easy to maintain. The removal of the cover, formed at least partially by the first flange 7, corresponds to the removal of the filter cartridge.

Furthermore, it is no longer possible to overlook the operation of putting back a filter cartridge inside the filter assembly since the cartridge is at least partially constituted by the cover and therefore the external wall.

In this first embodiment, the first flange 7 is configured to cooperate by force with the vessel 3, as can be seen especially in FIG. 2, so as to close the filter element 2 in a tightly-sealed way. A gasket 11 is provided in order to ensure tight sealing between the vessel 3 and the first flange 7.

The vessel 3, in an unattached end portion 18, has a substantially cylindrical shape. The end portion 18 terminates in an upper edge 15, which is unattached, of the vessel 3.

The first flange 7 has a circular shape having a peripheral shoulder which, in this example, comprises an internal peripheral shoulder 12 and an external peripheral shoulder 14. The internal peripheral shoulder 12 matches the vessel 3 internally. This internal peripheral shoulder 12 has an annular housing 13 arranged to house the gasket 11 which is also annular. The gasket 11 in this example has a circular cross-section, but it could be of another shape without departing from the framework of the invention. For example the gasket 11 may have an oval cross-section.

The external peripheral shoulder 14 is configured to at least partially take support on an upper edge 15 of the vessel 3. The external peripheral shoulder 14 has a diameter greater than that of the internal peripheral shoulder 12.

In this first embodiment of the disclosure, the filter assembly 1 comprises a holder 25 for holding the first flange 7 to the vessel 3, configured to hold the first flange 7 fixedly on the vessel 3.

In this example, the holder 25 is formed by an upper extension 26 of the tube 5 passing through an aperture 27, in this example the central aperture, of the first flange 7 and cooperating in a tightly sealed way with the aperture 27.

Figure 5:
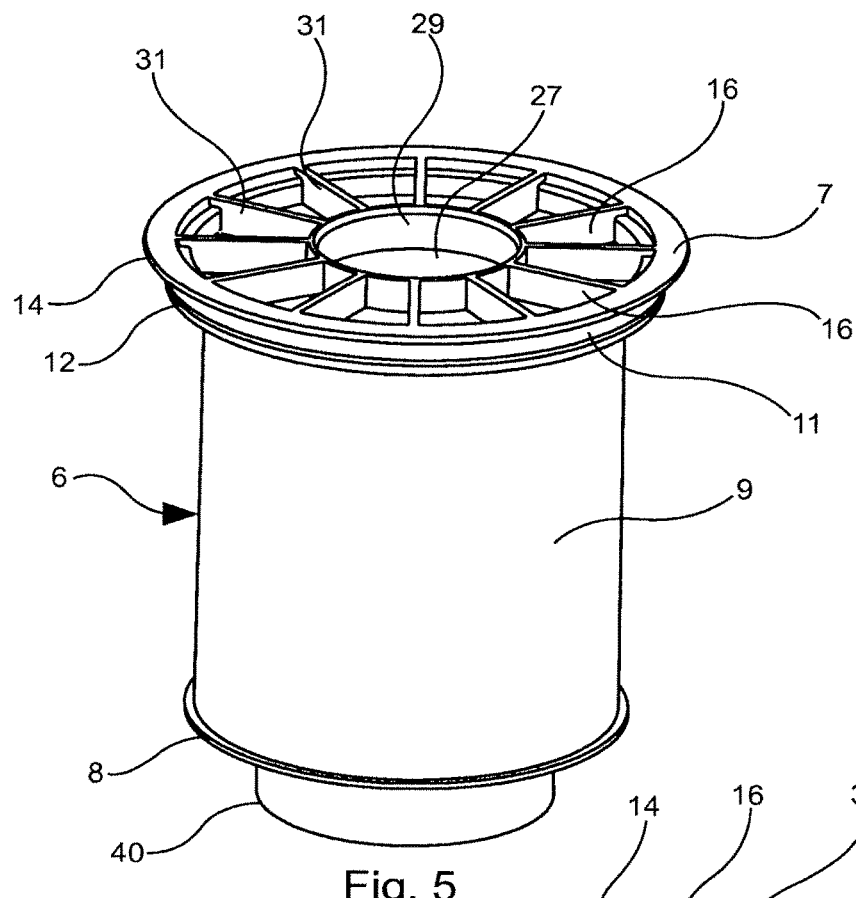
FIG. 5 is an isolated, schematic and perspective view of a filter cartridge used in the filter assembly of FIG. 1.
Figure 6:
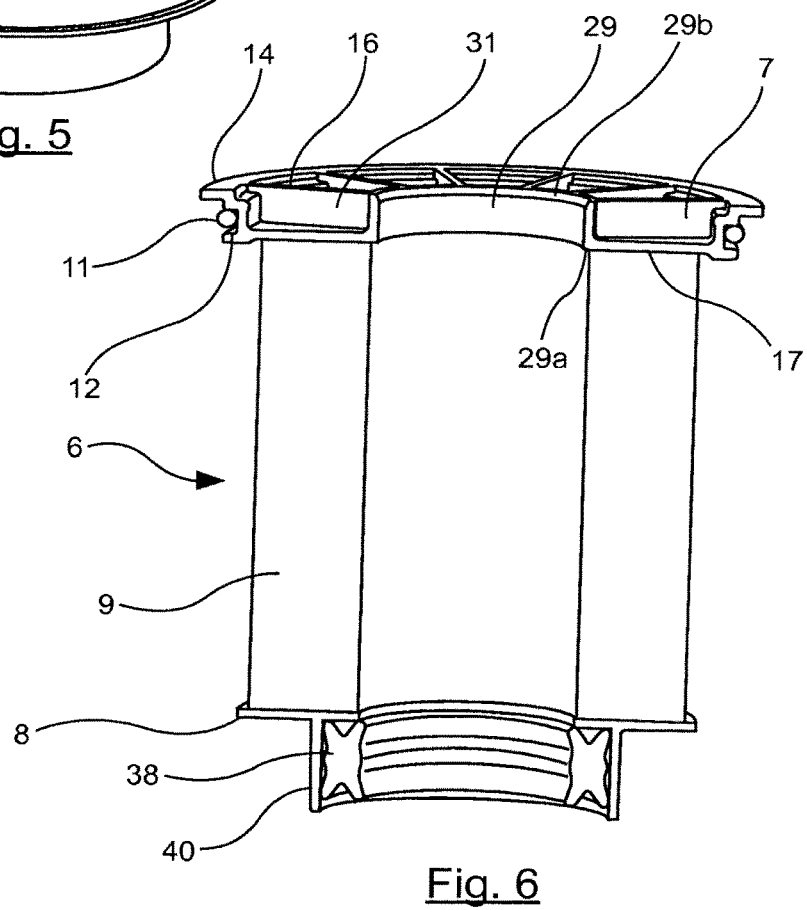
FIG. 6 is a schematic view in longitudinal section of the filter cartridge of FIG. 5.
Figure 7:
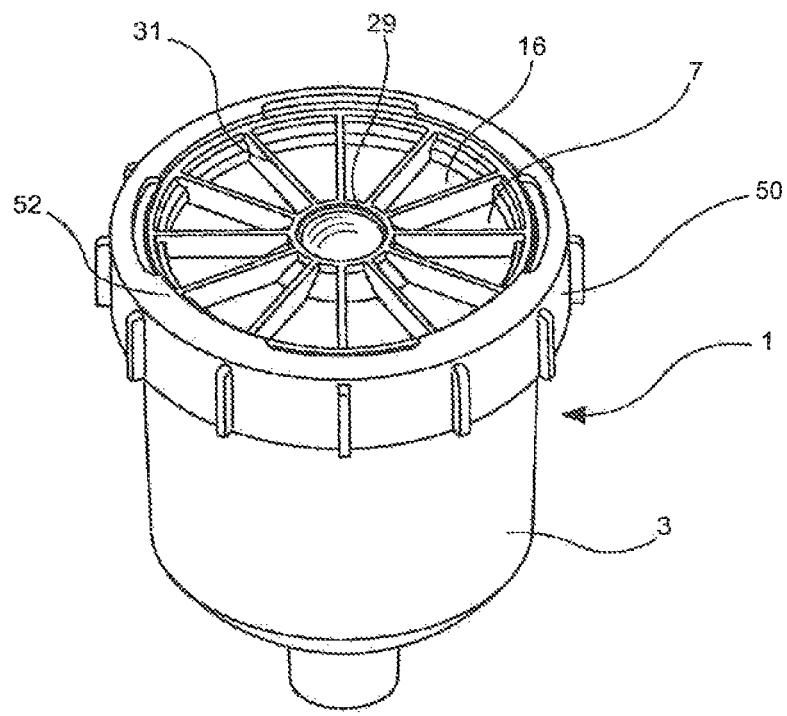
FIG. 7 is a schematic view in perspective of a filter assembly according to a second embodiment of the disclosure.

The first flange 7, as can be seen more particularly in FIGS. 5 and 6, includes an external face 16 partially forming the external wall of the filter assembly 1 and an internal face 17 in contact with or in the vicinity of the filtering medium 9. The external face 16 has a plurality of reinforcing elements 31 formed in parallel to the longitudinal axis X and extending between the aperture 27, the inner peripheral shoulder 12 and the outer peripheral shoulder 14 as can be seen.

A gasket 28 is planned with an annular shape to provide for tight sealing between the upper extension 26 of the tube 5 and the first flange 7. The upper extension 26 is configured to abut against an external face 16 of the first flange 7. The upper extension 26 includes a rim 30 that rests on the external face 16 of the first flange 7, and extends throughout its periphery.

The aperture 27 is formed in a cylinder portion 29 with a height substantially equal to that of the reinforcing elements 31 and extending between the lower face 17 and an upper shoulder formed on the external face 16 of the first flange 7 against which the rim 30 of the upper extension 26 abuts.

The upper extension 26, as can be seen in FIGS. 1 to 4, has a hexagonal cross-section. The upper extension 26 of the tube 5 in this example forms a grasping zone for an operator. The upper extension 26 is at an upper end of the tube 5. The lower end 34 of the tube 5 extends up to the outlet channel 22, within it. A gasket 35 is at the lower end 34 of the tube 5.

The tube 5 is fixedly joined to the vessel 3. In the example shown, the tube includes an external thread 36 at its lower part, configured to cooperate with an internal thread 37 of an internal zone 39 with a substantially cylindrical shape at the lower part, within the vessel 3. Thus, the tube 5 is screwed removably to the vessel 3.

The second flange 8 has a cylindrical portion 40 extending downwardly in moving away from the filtering medium 9, housing a gasket 38, which is ring-shaped, so as to provide for tight sealing between the filter cartridge 6, the tube 5 and also the internal zone 39 of the vessel 3.

When replacing the filter cartridge 6, as illustrated in FIGS. 3 and 4, the operator starts by unscrewing the tube 5 in turning the upper extension 26 so as to remove it completely. Thus, the filter cartridge 6 is released and can be withdrawn and replaced by a new cartridge. Once the new filter cartridge 6 has been positioned in the vessel 3, the tube 5 is put back and screwed into the vessel 3 until the rim 30 of the upper extension 26 takes support on the external face 16 of the first flange 7.

The gasket 38, which is fixedly joined to the second flange 8, and the gasket 11, fixedly joined to the first flange 7, are changed at the same time as the filter cartridge 6 and that it is therefore not necessary for the operator to handle the gaskets during the replacement of the filter cartridge 6, which is desirable.

FIGS. 7 to 16 show a second embodiment of the filter assembly 1 according to the disclosure.

Figures 12, 13:
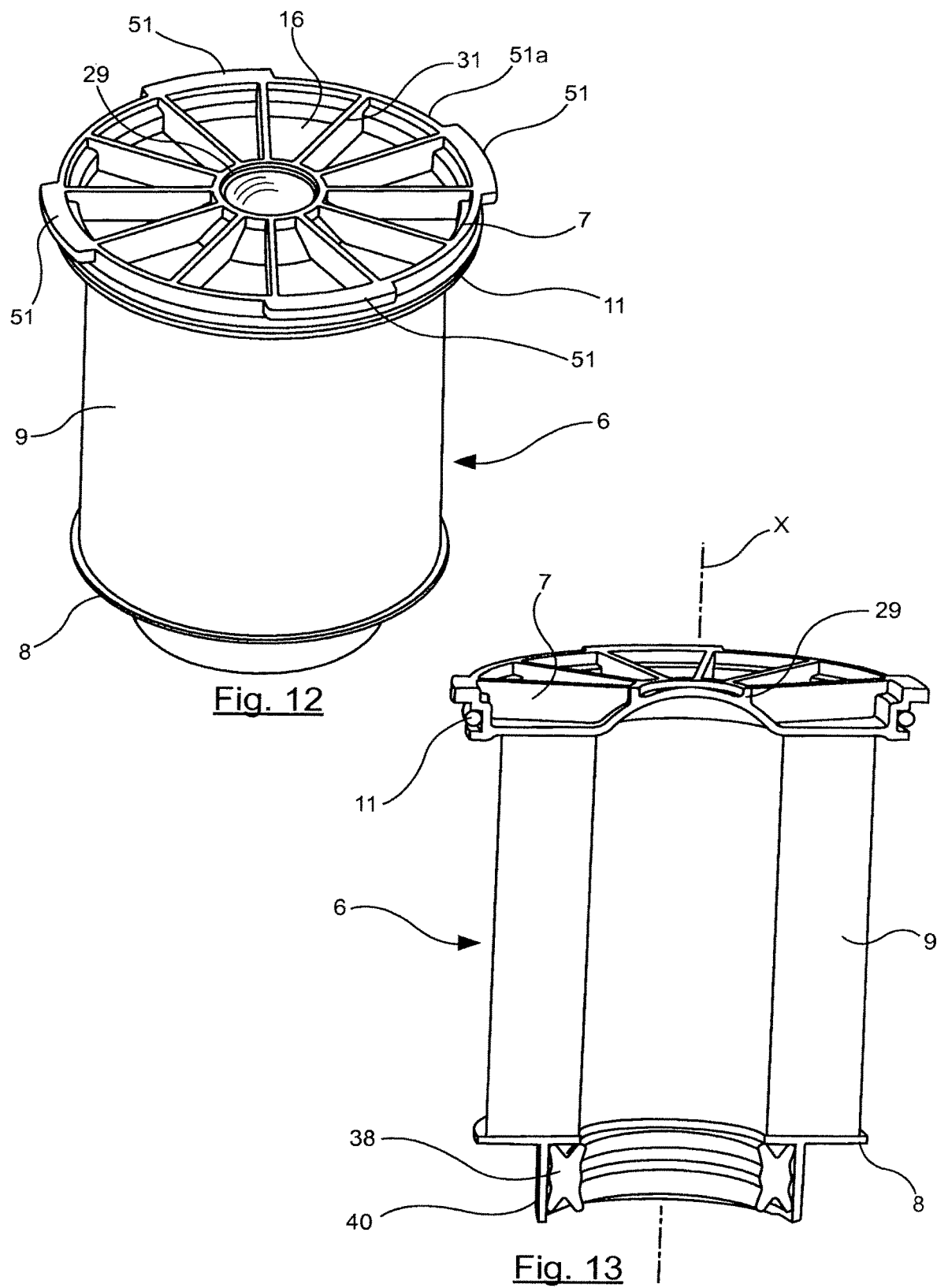
FIG. 12 is an isolated, schematic and perspective view of the filter cartridge of the filter assembly of FIG. 7.
FIG. 13 is a schematic illustration in longitudinal section of the filter cartridge of FIG. 12.

In this embodiment, the first flange 7 does not include any central apertures 27 but is solid on its entire external face 16, also having reinforcement elements 31 and a cylindrical portion similar to the cylinder portion 29 within which the material forming the first flange 7 is also present, in a convex shape as can be seen especially in FIG. 13.

The holder 24 is formed in this embodiment by a closing ring 50 fixedly joined externally to the end portion 18 of the vessel 3 while at the same time being partially mobile rotationally in relation to the vessel 3. In this embodiment, the closing ring 50 is removable from the vessel 3 but that, without departing from the framework of the disclosure, it could remain fixedly joined to the vessel 3 without being removable.

The closing ring 50 includes a portion to get fixedly joined, especially by screwing, to the vessel 3 and the retaining shoulder 52 extending diametrically inwardly.

In this example, the fixed-joining portion externally includes a plurality of protruding elements 59 substantially parallel to the longitudinal axis X facilitating the mounting and dismounting of the closing ring 50 on the vessel 3, especially its manual mounting and dismounting, by preliminary screwing by hand so as not to use any tightening tool at the end of travel in order to apply the necessary tightening torque. These protruding elements 55 also reinforce the solidity of the closing ring 50.

Figure 8:
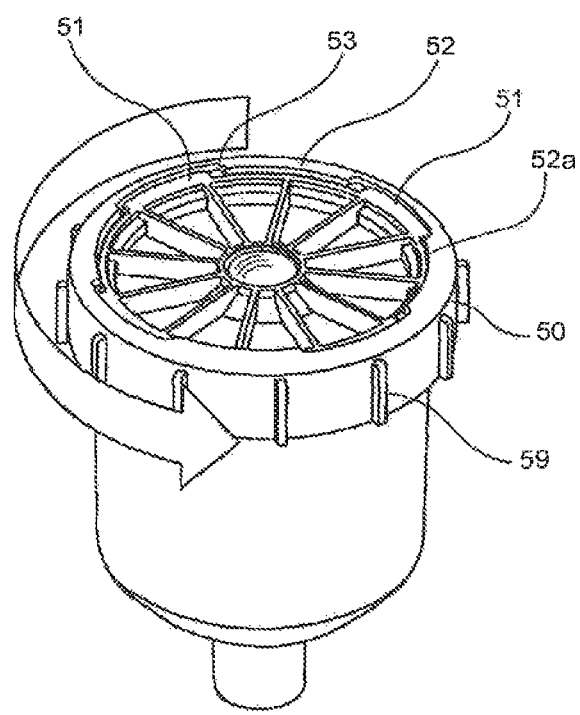
FIG. 8 is a schematic illustration in perspective of the possibility of putting the closing ring of the filter assembly of FIG. 7 into rotation.
Figure 15:
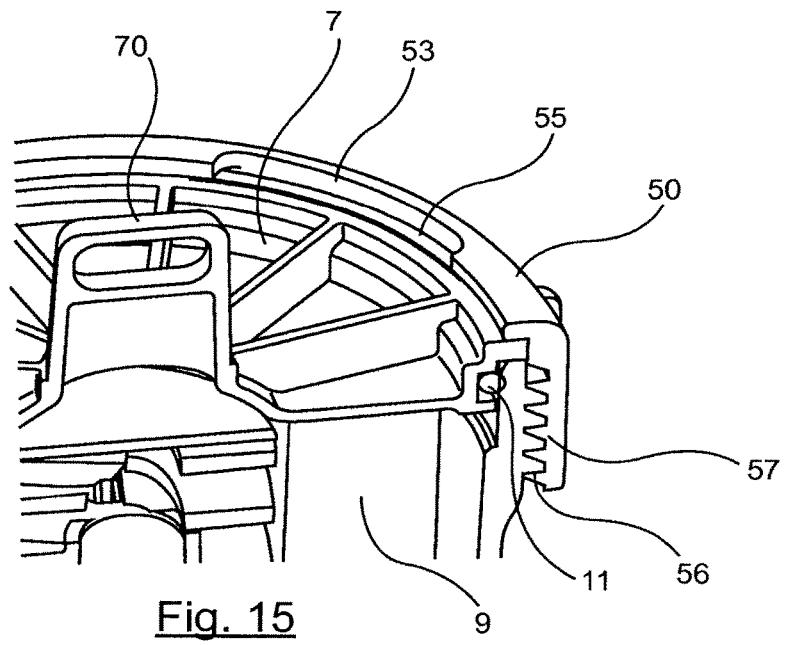
FIGS. 15 and 16 are views in longitudinal section, seen schematically and partially, in perspective, of the working of the holder in the filter assembly of FIG. 7.
Figure 16:
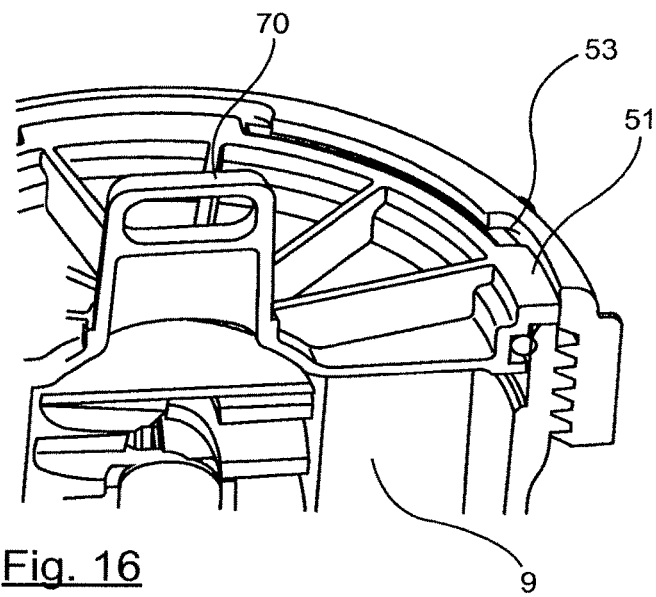
Figure 17:
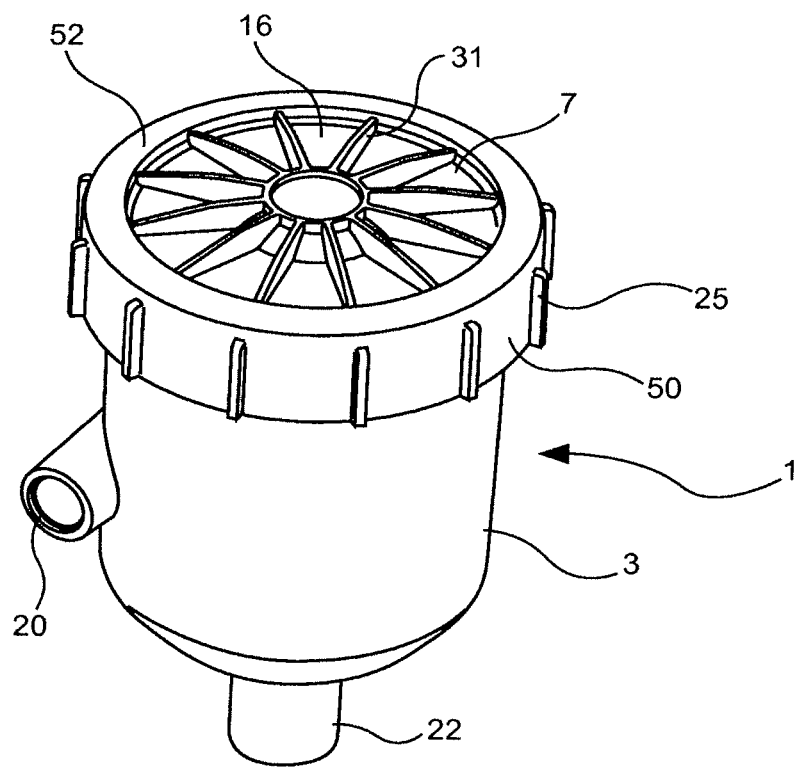
FIG. 17 is a schematic illustration in perspective of a third embodiment of the filter assembly according to the disclosure.

The closing ring 50 is configured so that it can pass by partial rotation, symbolized by the arrow in FIG. 8, from a first position which can be seen in FIG. 16, enabling the withdrawal of the filter cartridge out of the vessel 3 or the positioning of the filter cartridge 6 in the vessel 3, to a second position which can be seen in FIG. 15 which on the contrary prevents the withdrawal of the filter cartridge 6 from the vessel 3 or the positioning of the filter cartridge 6 in the vessel 3.

To this end, the first flange 7 includes, on the external peripheral shoulder 14, a plurality of fins 15, e.g. four in number in the illustration shown, which can be seen in FIG. 12. The closing ring 50, in the retaining shoulder 52, includes a plurality of notches 53, e.g. four in number in the example shown. The notches 53 are configured to cooperate with the fins 51 so as to make the closing ring 50 pass by partial rotation of the closing ring 50, in this example by about 45°, from the first position in which the notches 50 and the fins 51 are superimposed to the second position in which the notches 53 and the fins 51 are positioned so as to be offset, without being superimposed, as can be seen respectively in FIGS. 15 and 16.

The upper edge 15 of the vessel 3 is provided with at least one abutment 55, e.g. four in the example shown, which are to extend between two adjacent fins 51 in order to prevent any rotational movement of the filter cartridge 6 relative to the vessel 3 so as to prevent the simultaneous rotation of the closing ring 50 and the filter cartridge 6 and so as to accurately position the filter cartridge 6 in the vessel 3.

In order to fixedly join the closing ring 50 to the vessel 3, an external thread 56 is provided, in this example, on the external periphery of the unattached end portion 18 of the vessel 3. A corresponding internal thread 57 is provided on the closing ring 50 so as to enable the closing ring 50 to be attached to the vessel 3 by being screwed on to it.

The second position of the closing ring 50 is obtained by sufficient screwing of the closing ring to the vessel 3 so as to prevent any movement of the filter cartridge 6 even in the case of high pressure within the filter assembly 1.

Figure 9:
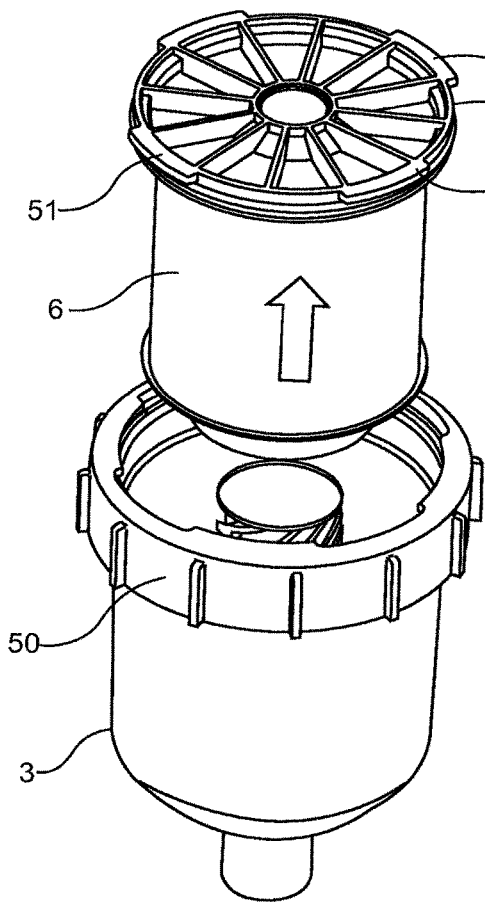
FIG. 9 is a schematic illustration in perspective of the withdrawal of the filter cartridge from the vessel of the filter assembly of FIG. 7.
Figure 10:
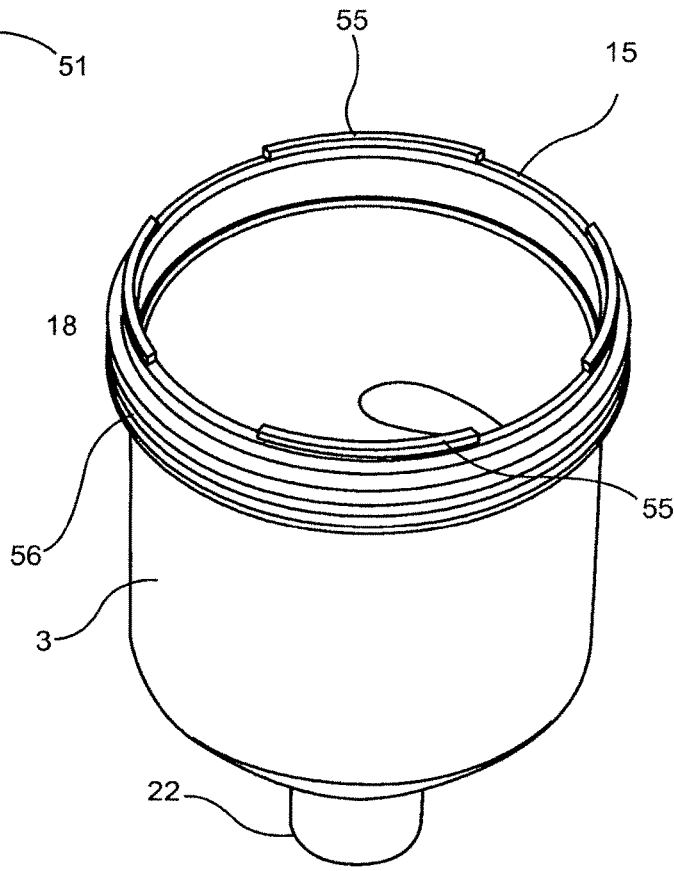
FIG. 10 is an isolated, perspective and schematic view of the vessel of the filter assembly of FIG. 7.
Figure 11:
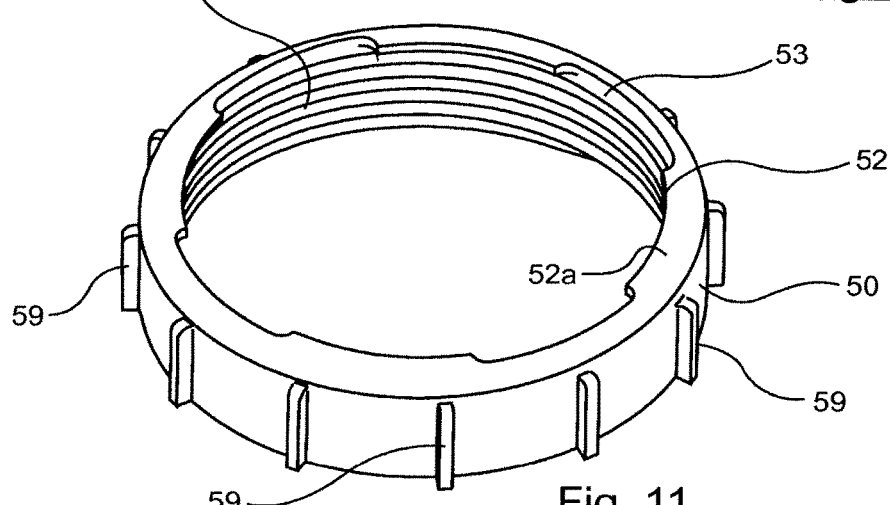
FIG. 11 is an isolated, schematic and perspective view of the closing ring of the filter assembly of FIG. 7.

To enable the positioning of a new filter cartridge 6 or the withdrawal of a used filter cartridge, it is not necessary in this example to withdraw the closing ring 50 which remains fixedly joined to the vessel 3. It is enough, as shown in FIG. 8, to turn the closing ring 50 by about one-eighth of a turn so as to superimpose the fins 51 and the notches 53 and, as illustrated in FIG. 9, enable the removal of the used filter cartridge 6 and then the positioning of a new filter cartridge 6. Then, the closing ring 50 is rotated by one-eighth of a turn in the reverse sense in order to prevent the withdrawal of the new filter cartridge 6.

It must be noted that, in the second position illustrated in FIG. 15, the notches 53 are substantially superimposed on the stops 55 of the upper edge 15 of the vessel 3 while, in the first position illustrated in FIG. 16, it is the notches 53 and the fins 51 that are superimposed.

In this embodiment, the tube 5 is for example fixedly joined to the vessel 3 and is not removable.

The first flange 7 is, as in the first embodiment, in contact with an inner shoulder of the end portion 18 of the vessel 3 and furthermore takes support on the upper edge 15 of the vessel 3 by means of its fins 51.

Figure 14:
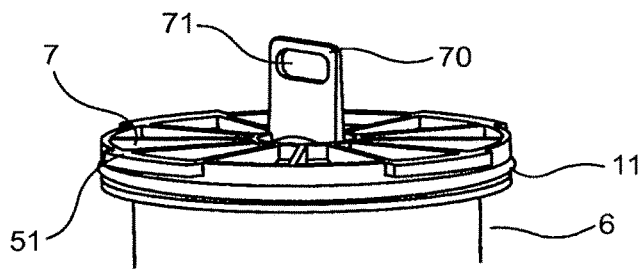
FIG. 14 is a schematic illustration in perspective of the presence of a grip or handle in the filter assembly of FIG. 7.

As illustrated in FIGS. 14 to 16, the first flange 7 can include a grip 70, which may or may not be removable, having a slotted grasping zone 71 so that, if necessary, the filter cartridge 6 can be handled by an operator when it is being replaced or when the filter assembly 1 is being replaced.

FIGS. 17 to 25 show a third embodiment of the filter assembly 1 according to the disclosure.

Figure 18:
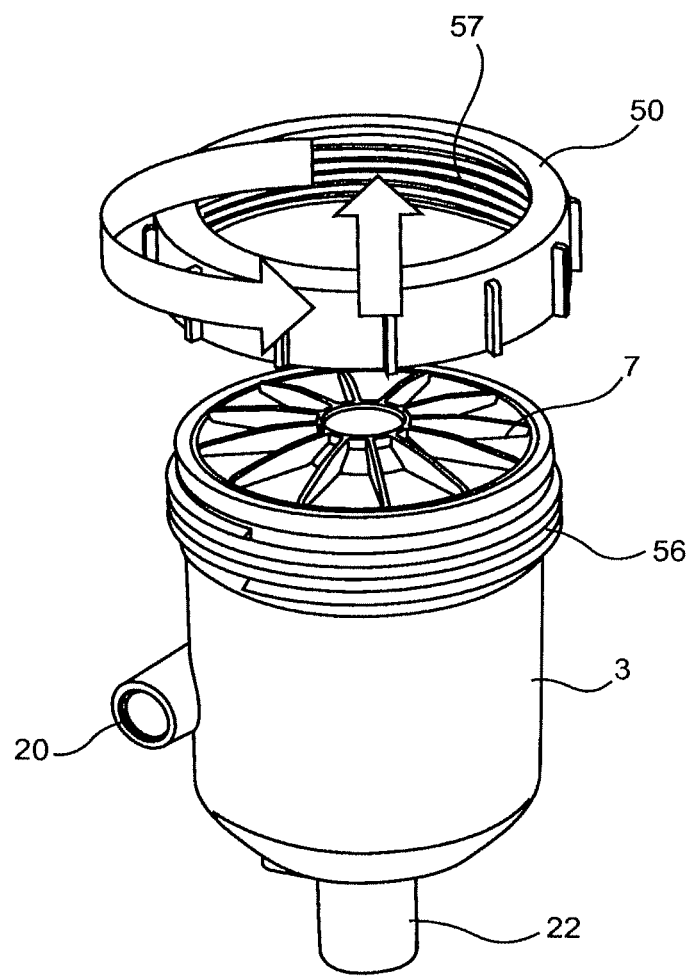
FIG. 18 is a schematic illustration in perspective of the withdrawal of the closing ring in the filter assembly of FIG. 17.
Figure 19:
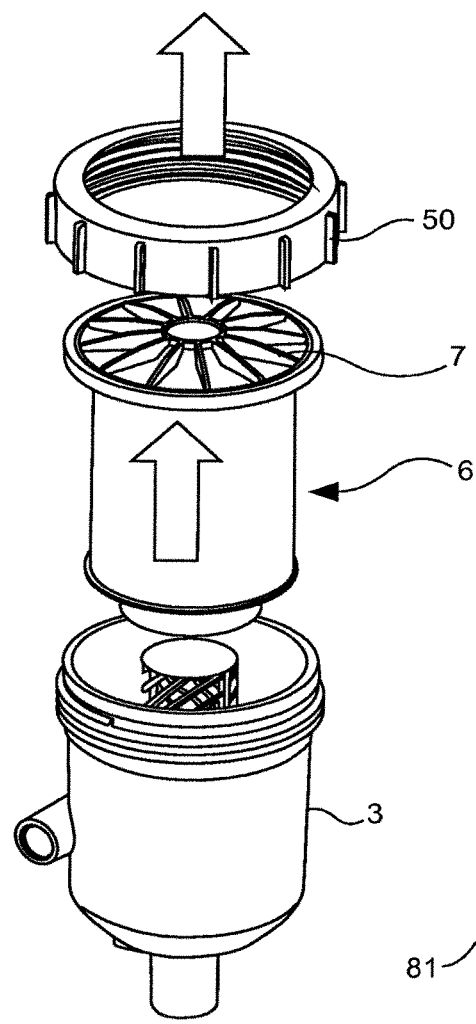
FIG. 19 is a schematic illustration in perspective of the withdrawal of the filter cartridge from the filter assembly of FIG. 17.

In this embodiment, the holder 25 is formed by a removable closing ring 50, which must be totally detached from the vessel 3 to enable the removal or positioning of a filtering cartridge 6, as can be seen in FIGS. 18 and 19.

In this embodiment, the closing ring 50 is fixed by screwing to the vessel 3 by corresponding threads 56 and 57, formed respectively on the vessel 3 and the closing ring 50.

When it is fixedly joined to the vessel 3 in the holding position, the closing ring 50 prevents any withdrawal of the filtering cartridge 6. The holding position is the one in which any motion of the filtering cartridge 6 is prevented, especially by a sufficient tightening of the closing ring 50 relative to the vessel 3.

The first flange 7 has a circular peripheral shoulder 80 which has a peripheral rib 81. A gasket 82 is configured to cooperate with the peripheral rib 81. To this end, the gasket 82 includes a groove 83 corresponding to the peripheral rib 81, so as to make them cooperate to fixedly join the gasket 82 to the first flange 7. The gasket 82 is thus in contact with the closing ring 50, the upper edge 15 of the vessel 3 and the first flange 7, as can be seen in FIG. 22.

Figure 22:
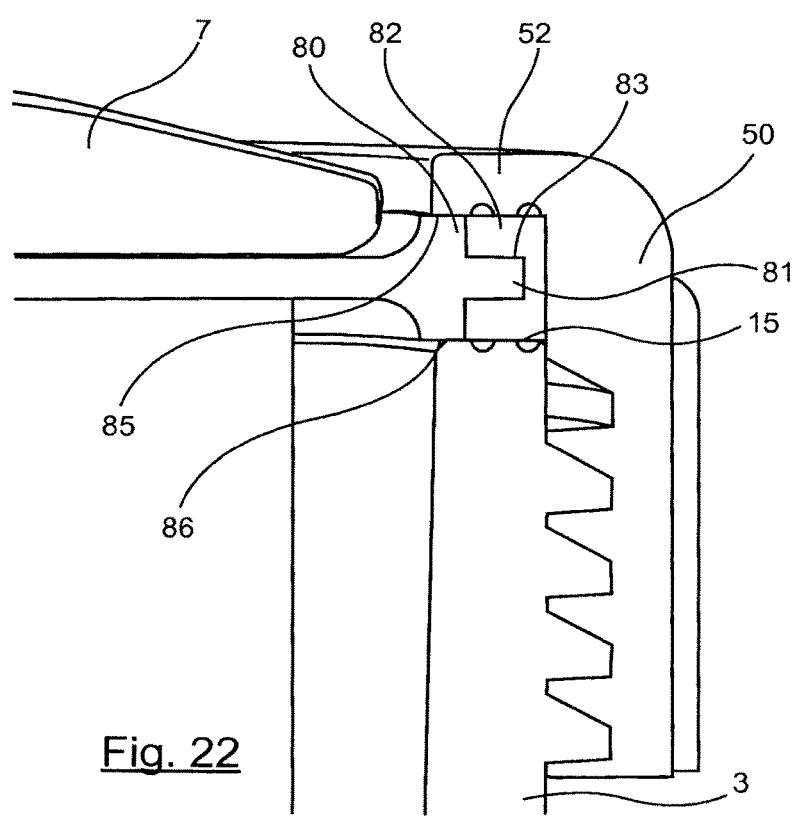
FIG. 22 is a schematic and partial view in longitudinal section of the cooperation between the first flange, the closing ring and the vessel in the filter assembly of FIG. 17.

As illustrated in FIG. 22, the peripheral shoulder 80 of the first flange 7 also has an upper surface 85 and a lower surface 86 coming respectively into contact with the retaining shoulder 52 of the closing ring 50 and the upper edge 15 of the vessel 3. Such a configuration can make it possible to obtain sufficient sealing of the closing of the filter assembly and efficient holding of the filter cartridge 6 within the vessel 3.

Figure 20:
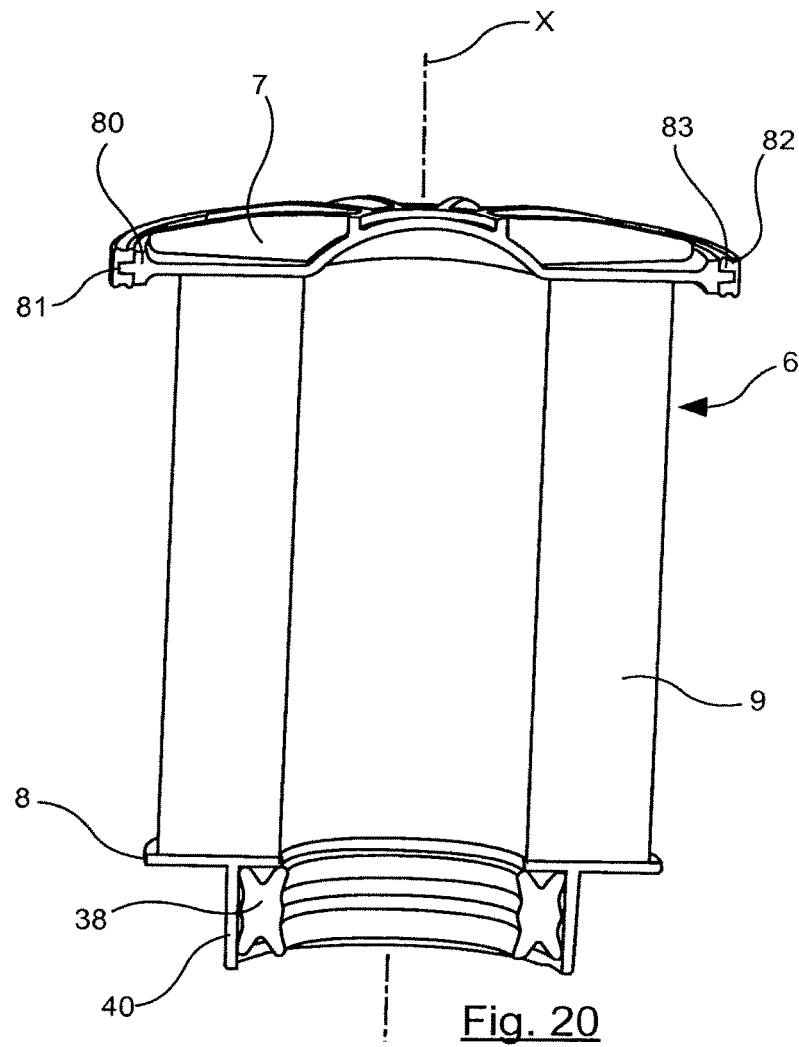
FIG. 20 is an isolated, schematic view in longitudinal section of the filter cartridge of the filter assembly of FIG. 17.
Figure 21:
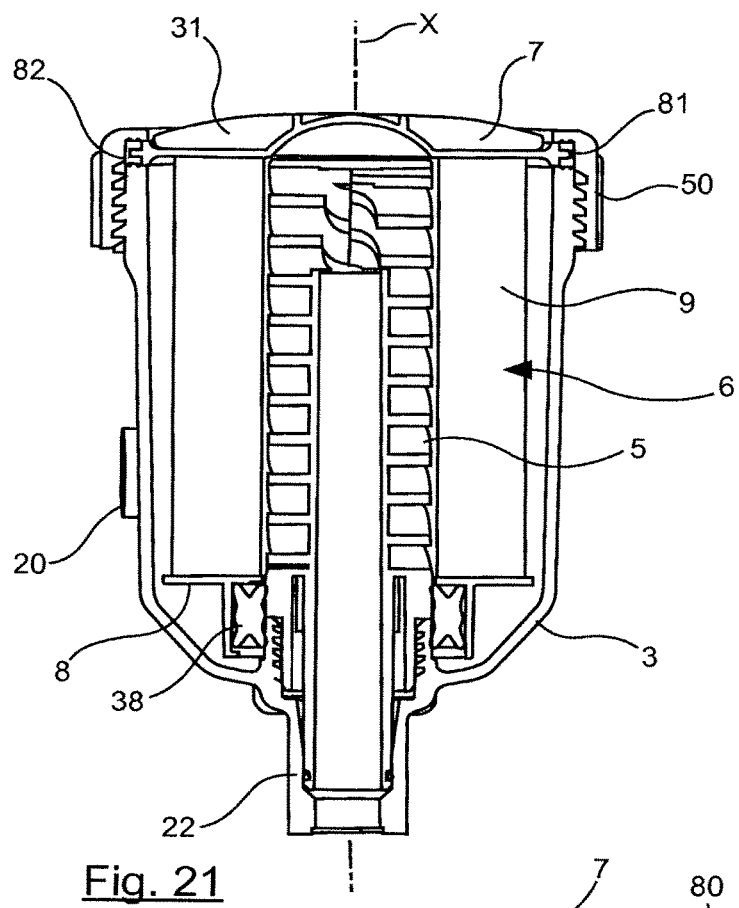
FIG. 21 is a schematic view in longitudinal section of the filter assembly of FIG. 17.

As can be seen in FIG. 20, the tube 9 is fixed by screwing into the vessel 3. However, it is not withdrawn during the replacement of the filtering cartridge 6.

Figure 23:
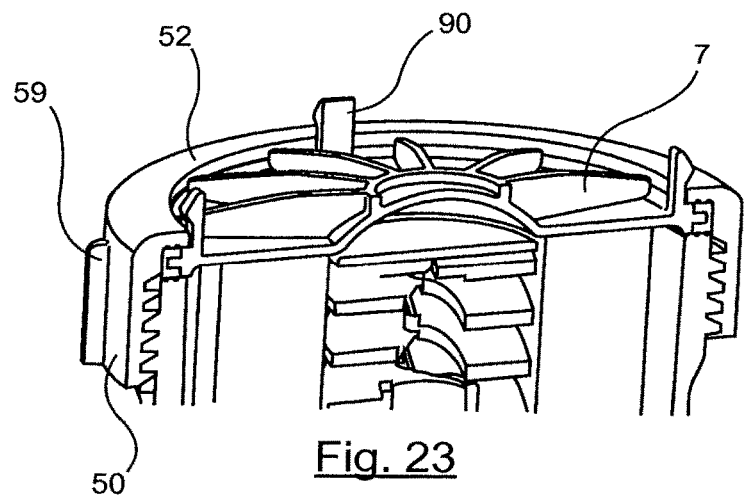
FIGS. 23 to 25 are partial, schematic views in longitudinal section illustrating one variant of the third embodiment of the disclosure.
Figure 24:
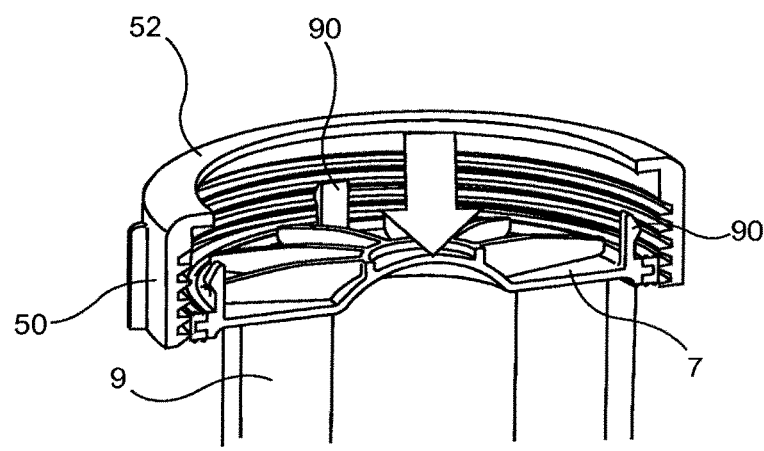
Figure 25:
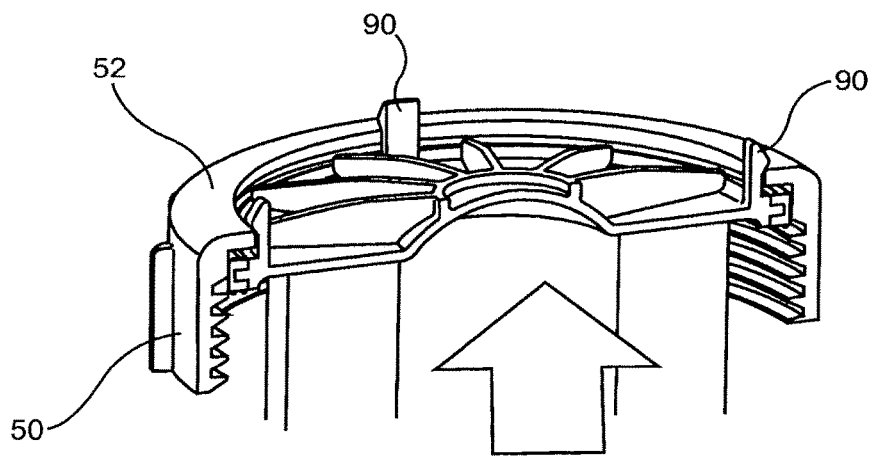

FIGS. 23 to 25 show the possibility, in one variant, of providing clip-on tabs 90 on the first flange 7, e.g. four in number in the example illustrated, that get clipped on to the top of the retaining shoulder 52 of the closing ring 50 when the filtering cartridge 6 is in the right position in the vessel 3. The filter cartridge thus remains in the closing ring 50 during dismounting, thus preventing the operator from grasping the filter cartridge. The operator can unclip the filter cartridge by lateral impact on the bottom of the filter cartridge in such a way that it falls directly into the bin.

The number of clip-on tabs can be different from four without departing from the framework of the disclosure.

The first flange 7 may be reinforced as compared with other flanges, so as to be able, mechanically, to fulfill its role of a cover, even partially, for the filter assembly. To this end, reinforcing elements have been provided in particular, as illustrated and described further above. Other reinforcements or a different shape for the first flange can be planned without departing from the framework of the disclosure.

The first flange 7 can be fixedly joined to and/or possibly include a holder, if necessary. The holder can be formed by one or more different and/or distinct parts of the filter assembly.

The disclosure provides a filter assembly 1 to filter at least one fluid, including fluid flowing in a hydraulic motor or apparatus, and other fluids, the filter assembly including:

a filter element 2, including a vessel 3 and a cover 4, a tube 5, including a central tube, within the filter element 2 extending along a longitudinal axis X, a removable filter cartridge 6 housed in the filter element 2 and comprising a first flange 7, a second flange 8, and a filtering medium 9 extending between the first and second flanges 7, 8 and having a tubular hollow space 10 to surround the tube 5, characterized in that the first flange 7 of the filter cartridge 6 at least partially forms the cover 4 of the filter element 2.

Throughout the description, the expressions "including one" or "comprising one" must be understood as being synonymous with the expressions "including at least one" or "comprising at least one" respectively, unless the contrary is specified.

The disclosure provides a filter assembly 1 having a canister housing or vessel 3 closable by a lid or cover 4 and containing a removable and replaceable filter element cartridge 6. The lid 4 is part of the filter element cartridge 6 and a single unitary component therewith, such that removal of filter element cartridge 6 also removes lid 4, and replacement of filter element cartridge 6 also replaces lid 4. An attachment member or holder 25, 50 coacts between canister housing 3 and lid 4, and has a locked position engaging the lid and biasing the lid into sealing engagement with the canister housing with filter element cartridge 6 in the canister housing, and having an unlocked position permitting withdrawal of the noted single unitary component, including lid 4 and filter element cartridge 6 from canister housing 3. Canister housing 3 extends axially along axis X between first and second distally opposite ends, e.g. upper and lower ends, respectively, in the drawings. The first or upper end has an open mouth receiving filter element cartridge 6 inserted axially downwardly therethrough, and then closed by lid 4. Filter element cartridge 6 extends axially along axis X and has an axially extending hollow interior 10. Canister housing 3 has a circumferential sidewall 3a spaced radially outwardly of filter element cartridge 6. The filter element cartridge has an outer sidewall surface facing the circumferential sidewall of canister housing 3, and having an inner sidewall surface facing hollow interior 10. Lid 4 spans the noted open mouth of canister housing 3 and is biased by the noted attachment member 25, 50 in the noted locked position into sealing engagement with the circumferential sidewall of canister housing 3 at the noted first upper end thereof. As disclosed, the attachment member engages lid 4 at one of: a) hollow interior 10 of filter element cartridge 6; and b) the circumferential sidewall of canister housing 3.

In one embodiment, attachment member 25 engages lid 4 at flange 7 at the hollow interior 10 of filter element cartridge 6. Lid 4 at flange 7 has a central aperture 27 axially aligned with hollow interior 10 of filter element cartridge 6. Central aperture 27 has a sidewall 29, FIG. 6, with an inner shoulder 29a (lower shoulder) axially facing hollow interior 10 of filter element cartridge 6, and a distally opposite outer shoulder 29b (upper shoulder) facing axially away from hollow interior 10 of filter element cartridge 6. Attachment member 25 engages lid 4 at flange 7 at the noted outer upper shoulder 29b of sidewall 29 of central aperture 27. Attachment member 25 has a flange 30 having a greater diameter than central aperture 27, which flange 30 extends laterally beyond central aperture 27 and overlaps the noted outer upper shoulder 29b of aperture sidewall 29 in axially aligned relation. Attachment member 25 has a shank or tube 5 extending from flange 30 axially into hollow interior 10 and engaging canister housing 3 to attach lid 4, 7 thereto. In one embodiment, the noted shank threadingly engages canister housing 3 at the noted second lower end of the canister housing.

In another embodiment, attachment member 50 engages lid 4 at circumferential sidewall 3a of canister housing 3. The lid 4 at flange 7 has an outer flange at 51, 80 at circumferential sidewall 3a of canister housing 3, and attachment member 50 engages the lid at such outer flange. In one embodiment, the outer flange of the lid includes a plurality of circumferentially spaced tabs or fins 51 extending radially outwardly away from axis X and circumferentially spaced from each other by arcuate slots 51a therebetween. Attachment member 50 is provided by an outer ring secured to canister housing 3 at the noted first upper end and at least partially turnable about axis X between the noted locked and unlocked positions. Outer ring 50 has a plurality of circumferentially spaced tabs 52a extending radially inwardly towards axis X and circumferentially spaced from each other by arcuate slots or notches 53 therebetween. Tabs 52a of outer ring 50 are axially aligned with tabs 51 of the outer flange of lid 4 when outer ring 50 is in the noted locked position. Tabs 52a of outer ring 50 are axially aligned with slots 51a of the outer flange of lid 4 when outer ring 50 is in the noted unlocked position. In one embodiment, outer ring 50 is secured to canister housing 3 in threaded relation at 56 at the noted first upper end of the canister housing. In one embodiment, lid 4 at flange 7 is sealed to canister housing 3 at a radial seal 11 at circumferential sidewall 3a.

In one embodiment, attachment member 50 is an outer ring threadingly secured to canister housing 3 at the noted first upper end thereof in the locked position and threadingly removable therefrom to the unlocked position by turning outer ring 50 about axis X. Outer flange 80 of lid 4 at flange 7 has a first surface 85, FIG. 22, engaged by outer ring 50 in the noted locked position, and a second surface 86 engaging the top of circumferential sidewall 3a of canister housing 3 at the noted first upper end in the locked position of outer ring 50. First and second surfaces 85 and 86 of outer flange 80 are axially distally opposite each other and axially spaced from each other by a given axial thickness of outer flange 80 therebetween. First surface 85 faces axially away from hollow interior 10 of filter element cartridge 6. Second surface 86 faces axially toward hollow interior 10. Circumferential sidewall 3a of canister housing 3 has a circumferential lip surface or upper edge 15 at the noted first upper end of the canister housing facing axially toward and engaged by second surface 86 of outer flange 80 of the lid. First and second surfaces 85 and 86 and the noted given axial thickness therebetween provide a stop which limits axial advancement of outer ring 50 toward canister housing 3 to concomitantly provide a stop against overtightening of outer ring 50 threadingly to canister housing 3. Lid 4 at outer flange 80 is sealed to canister housing 3 at an axial seal, e.g. at gasket 82 at the circumferential sidewall of the canister housing.

In one embodiment, a plurality of clip tabs 90, FIGS. 23-25, extend axially from lid 4 along an axial direction away from filter element cartridge 6. Clip tabs 90 have a first retaining position axially aligned with outer ring 50 in interfering relation to retain outer ring 50 on lid 4 including in the noted unlocked position. Clip tabs 90 are radially deflectable inwardly to a second releasing position allowing clearance and axial movement of outer ring 50 therepast.

In the foregoing description, certain terms have been used for brevity, clarity, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

What is claimed is:

1. A filter assembly comprising a canister housing closable by a lid and containing a removable and replaceable filter element cartridge, said lid being part of said filter element cartridge and a single unitary component therewith, such that removal of said filter element cartridge also removes said lid, and replacement of said filter element cartridge also replaces said lid, said filter assembly further comprising an attachment member coacting between said canister housing and said lid, said attachment member having a locked position in which the attachment member engages said lid to join said single unitary component to said canister housing and having an unlocked position permitting withdrawal of said single unitary component from said canister housing, said attachment member comprising an upper end engaging said lid in the locked position, and said attachment member extending axially into a hollow interior of said filter element cartridge in the locked position.

2. The filter assembly according to claim 1 wherein said attachment member biases said lid into sealing engagement with said canister housing with said filter element cartridge in said canister housing in the locked position.

3. The filter assembly according to claim 2 wherein said canister housing extends axially along an axis between first and second distally opposite ends, said first end being an open mouth receiving said filter element cartridge inserted axially therethrough and then being closed by said lid, said filter element cartridge extending axially along said axis, said hollow interior extending axially, said canister housing having a circumferential sidewall spaced radially outwardly of said filter element cartridge, said filter element cartridge having an outer sidewall surface facing said circumferential sidewall of said canister housing, and having an inner sidewall surface facing said hollow interior, wherein said lid spans said open mouth and is biased by said attachment member in said locked position into sealing engagement with said circumferential sidewall of said canister housing at said first end.

4. The filter assembly according to claim 3 wherein said lid has a central aperture axially aligned with said hollow interior of said filter element cartridge, said central aperture has a sidewall with an inner shoulder axially facing said hollow interior of said filter element cartridge, and a distally opposite outer shoulder axially facing away from said hollow interior of said filter element cartridge, and said attachment member engages said lid at said outer shoulder of said sidewall of said central aperture.

5. The filter assembly according to claim 4 wherein said attachment member has a flange having a greater diameter than said central aperture, and wherein said flange extends laterally beyond said central aperture and overlaps said outer shoulder in axially aligned relation.

6. The filter assembly according to claim 5 wherein said attachment member comprises a shank extending from said flange axially into said hollow interior and engaging said canister housing to attach said lid thereto.

7. The filter assembly according to claim 6 wherein said shank threadingly engages said canister housing at said second end of said canister housing.

8. The filter assembly according to claim 3 wherein said locked position said lid is sealed to said canister housing at a radial seal at said circumferential sidewall.

9. A removable and replaceable filter element cartridge for a filter assembly having a canister housing closable by a lid and containing said removable and replaceable filter element cartridge, said filter element cartridge being part of said lid and a single unitary component therewith, such that removal of said filter element cartridge also removes said lid, and replacement of said filter element cartridge also replaces said lid, wherein said filter assembly includes an attachment member coacting between said canister housing and said lid, said attachment member having a locked position in which the attachment member engages said lid to join said single unitary component to said canister housing and having an unlocked position permitting withdrawal of said single unitary component from said canister housing, said attachment member comprising an upper end engaging said lid in the locked position, and said attachment member extending axially into a hollow interior of said filter element cartridge in the locked position.

10. The removable and replaceable filter element cartridge according to claim 9 wherein said biases said lid into sealing engagement with said canister housing with said filter element cartridge in said canister housing in the locked position.

11. The removable and replaceable filter element cartridge according to claim 10 wherein said canister housing extends axially along an axis between first and second distally opposite ends, said first end being an open mouth receiving said filter element cartridge inserted axially therethrough and then being closed by said lid, said filter element cartridge extending axially along said axis, said hollow interior extending axially, said canister housing having a circumferential sidewall spaced radially outwardly of said filter element cartridge, said filter element cartridge having an outer sidewall surface facing said circumferential sidewall of said canister housing, and having an inner sidewall surface facing said hollow interior, wherein said lid spans said open mouth and is biased by said attachment member in said locked position into sealing engagement with said circumferential sidewall of said canister housing at said first end.

12. The removable and replaceable filter element cartridge according to claim 11 wherein said lid has a central aperture axially aligned with said hollow interior of said filter element cartridge, said central aperture has a sidewall with an inner shoulder axially facing said hollow interior of said filter element cartridge, and a distally opposite outer shoulder axially facing away from said hollow interior of said filter element cartridge, and said attachment member engages said lid at said outer shoulder of said sidewall of said central aperture.

* * * * *